under nited States Patent [19]

Mase et al.

[11] Patent Number: 5,557,789
[45] Date of Patent: Sep. 17, 1996

[54] TEXT RETRIEVAL METHOD AND APPARATUS BASED ON A HANDWRITTEN KEYWORD

[75] Inventors: Hisao Mase, Hirakata; Yasuharu Namba, Yao; Sachiko Koyama, Okazaki; Tadahiro Kiyama, Ichikawa; Hiroshi Tsuji, Itami, all of Japan

[73] Assignee: Hitachi, Ltd., Tokyo, Japan

[21] Appl. No.: 257,208

[22] Filed: Jun. 9, 1994

[30] Foreign Application Priority Data

Jun. 23, 1993 [JP] Japan ..................................... 5-176222

[51] Int. Cl.$^6$ ................................................... G06F 17/30
[52] U.S. Cl. ...................... 395/600; 364/419.19; 382/187
[58] Field of Search ........................ 395/600; 364/419.13, 364/419.19; 382/10, 13, 30

[56] References Cited

U.S. PATENT DOCUMENTS

| | | | |
|---|---|---|---|
| 5,062,074 | 10/1991 | Kleinberger | 395/600 |
| 5,131,054 | 7/1992 | Smith | 382/27 |
| 5,189,709 | 2/1993 | Wang et al. | 382/10 |
| 5,265,242 | 11/1993 | Fujisawa et al. | 395/600 |
| 5,347,477 | 9/1994 | Lee | 364/709.11 |
| 5,377,281 | 12/1994 | Ballard et al. | 382/40 |
| 5,452,451 | 9/1995 | Akizawa et al. | 395/600 |

OTHER PUBLICATIONS

Asakawa, Satoshi, et al. "Development of Full Text Search System Bibliotheca/TS", Transactions of the 45th National Convention of the Information Processing Society of Japan, 1992, pp. 3–239 –3–244. (provided in Japanese).

Kanno, Yuji, et al. "Recent Progress on Full Text Database", Technical Research Report of the Institute of Electronics, Information and Communication Engineers, DE90–34, pp. 31–40. (provided in Japanese).

*Primary Examiner*—Paul V. Kulik
*Attorney, Agent, or Firm*—Fay, Sharpe, Beall, Fagan, Minnich & McKee

[57] ABSTRACT

A text retrieval method and a text retrieval apparatus for retrieving texts based on a handwritten keyword inputted from an optical character reader are provided. Respective characters of a keyword string are recognized by character recognizing device, and recognized characters of respective characters are stored in a recognized character table. At least one recognized character is extracted as proposed recognized characters of respective characters from recognized characters stored in the recognized character table, and a plurality of character strings are generated by combining one proposed character among proposed recognized characters of respective characters with one another and stored in a keyword string table. A retrieval command string for retrieving texts including at least one character string among generated character strings out of a text database is generated, and the text database is retrieved by the retrieval command, thus obtaining a retrieved result.

8 Claims, 9 Drawing Sheets

| FIRST PROPOSED CHARACTER STRING | | 大口定期 (KATAKANA CHARACTERS) |
|---|---|---|
| CHARACTER No. | PROPOSED CHARACTER No. | PROPOSED CHARACTER |
| 1 | 1 | 大 |
|   | 2 | 太 |
| 2 | 1 | □ (KATAKANA CHARACTER) |
|   | 2 | 口 (MOUTH) |
|   | 3 | □ (SQUARE) |
| 3 | 1 | 定 |
| 4 | 1 | 期 |

| CHARACTER STRING No. 401 | KEYWORD STRING 402 |
|---|---|
| 1 | 大ロ定期 (ロ IS KATAKANA CHARACTER) |
| 2 | 太ロ定期 (ロ IS KATAKANA CHARACTER) |
| 3 | 大口定期 (口 IS MOUTH) |
| 4 | 太口定期 (口 IS MOUTH) |
| 5 | 大□定期 (□ IS SQUARE) |
| 6 | 太□定期 (□ IS SQUARE) |
| THE NUMBER OF KEYWORD STRING : 6 (403) | |

| TEXT ID | PART OF CHARACTER STRING | FREQUENCY |
|---|---|---|
| 468 | 定期 | 4 |
|  | 大口 | 3 |
| 2658 | 大？定期 | 5 |
|  | 定期 | 7 |
| 7112 | 期 | 5 |
|  | 口 | 3 |

FIG. 10

TEXT RETRIEVAL METHOD AND APPARATUS BASED ON A HANDWRITTEN KEYWORD

BACKGROUND OF THE INVENTION

The present invention relates to a text retrieval method and a text retrieval apparatus for extracting texts including a keyword string designated by an end user from a text database, and more particularly to a text retrieval method and a text retrieval apparatus when a keyword string is inputted using an optical character reader.

With the improvement of a processing speed of a computer, it has become possible to perform full text retrieval or keyword matching for voluminous texts and to extract a text including a keyword string designated by an end user at a high speed. As a typical system, a full text search system described in the Transactions of the 45th National Convention of the Information Processing Society of Japan (3)3-239 to 244, a full text database system described in the Technical Research Report of the Institute of Electronics, Information and Communication Engineers DE90-34 and so on may be mentioned. As a mode for instructing text retrieval, there are a command mode in which keyword strings are enumerated as arguments, a mode of describing retrieval instruction contents in a natural language statement and so on, but it is a mode of retrieving a keyword string as a clue finally in either case.

On the other hand, an input method of putting a character string composed of printing types or handwritten characters into a computer by pattern recognition in place of keyboard input has been put to practical use due to the development of character recognition processing technique. However, a character recognition rate is not 100% in general, but the performance of character recognition is deteriorated, in particular, when the shapes of characters bear a close resemblance to each other (for example, "口" in a Chinese character and "ロ" in a katakana character) and when one character is recognized as two characters (for example, "好" in a Chinese character is recognized as "女" and "子"). This problem is also applied to character recognition of a keyword string as a matter of course. The above-mentioned problem is also applied to a case when a keyword string is composed of the alphabet. For example, "IDOL" is recognized as "IOOL" or "JDOL", and "WIDE" is recognized as "VVIDE" sometimes.

In conventional character recognition technique, functions to present a recognized result to an end user to have the end user recognize it and to correct the result to another proposed recognized character as occasion demands become indispensable in order to amend an error in recognition as described above. However, the identifying work for ascertaining the difference between, for example, "口" in a Chinese character, "ロ" in a katakana character and a symbol "□", "へ" in a hiragana character and "ヘ" in a katakana character, and "り" in a hiragana character and "リ" in a katakana character is a heavy burden to the end user.

On the other hand, when text retrieval is made while "大口定期" including a Chinese character is misconceived as "大ロ定期" including a katakana character, it is a matter of course that none of desired texts is included in the retrieved result. Therefore, the more frequently errors of character recognition are generated, the more frequently the oversight in retrieval occurs. In a text retrieval system, it is possible to reduce noises included in the retrieved result (surplus texts included in the extracted result) to an appropriate quantity by narrowing-down retrieval or the like, but it is a heavy burden for the end user to reextract a text which could not be extracted in case of the oversight in retrieval (a state that a text to be extracted is not extracted) conversely to the above. Accordingly, it is important to adopt a processing system for reducing the oversight to the utmost even if noises are increased more or less.

Further, since texts which are possible to meet the requirement of the end user are extracted at random in the conventional text retrieval technique, no such processing as to further apply sequencing to the retrieved text is performed.

SUMMARY OF THE INVENTION

It is an object of the present invention to provide a text retrieval method and a text retrieval apparatus in which, even if there is a recognition error in character recognition, the oversight in text retrieval shows almost no change as compared with a case that there is no recognition error.

Further, it is another object of the present invention to provide a text retrieval method and a text retrieval apparatus which make it easy to find out an error in character recognition and also make the correction thereof possible by indicating the error in the result of character recognition based on the result of text retrieval.

Furthermore, it is still another object of the present invention to provide a text retrieval method and a text retrieval apparatus which make it possible to output the result of text retrieval having a preference for that which is closer to the requirement of the end user.

In order to achieve above-mentioned objects, text retrieval is performed in the following steps of procedure according to the present invention.

When a handwritten keyword for retrieving a text is inputted, respective characters forming the inputted keyword are recognized by a means of recognizing characters. At least one recognized character is extracted as a proposed recognized character for each character out of a plurality of recognized characters corresponding to respective characters by a predetermined method of extracting a proposed recognized character. Furthermore, a plurality of character strings are generated by combining one each proposed character in a plurality of proposed recognized characters corresponding to respective characters, and a retrieval command for retrieving a text including at least one character string among the generated plurality of character strings out of a text database.

Furthermore, according to the present invention, an end user can designate the method of extracting proposed recognized characters described above. Namely, as the method of extracting proposed recognized characters, either a method of extracting all of the recognized characters having a degree of similarity at a predetermined threshold or higher as proposed recognized characters or a method of extracting all of recognized characters by a predetermined number can be adopted, and the end user can designate the threshold of the degree of similarity or the number of proposed recognized characters.

Furthermore, a retrieval command is executed, and it is retrieved that in how many cases among the texts in the text database each of the plurality of character strings generated from the proposed recognized characters has been included, and the number of cases is held for each character string. When respective characters forming the character string included in the most texts and a first proposed character of corresponding characters recognized by the means of recognizing characters are different from each other, it is presented to the end user whether the first proposed character of the characters recognized by the means for recognizing characters is to be corrected to the character forming the character string in the text. When the end user instructs correction, the character string generated from proposed recognized characters is corrected to the character string in the text.

Further, a part of character string composed of one character or more which is included in the inputted character string and formed without disturbing the description order of respective characters is generated from the character string inputted from an input means, and a retrieval command for retrieving a text in which at least one of the generated part of character strings is included is generated. Namely, a character string obtained by replacing several characters included between a head character and a final character of the inputted character string with symbols showing indefiniteness is a part of character string.

Furthermore, it is determined which part of character string is included with respect to each text extracted by the execution of the retrieval command, the weights preset for part of character strings included in extracted texts are summed up and held as the scores of the extracted texts with respect to each of the extracted texts, and the extracted texts are presented to the end user taking preference for the text having higher scores.

According to the present invention, since new keyword strings are generated by combining proposed characters of a second proposed character and thereafter even when a first proposed character resulted from character recognition is in error, and a text including at least one of them is retrieved, the text is retrieved with an oversight rate same as that when there is no error in character recognition.

Further, since an error in the result of character recognition detected from the result of text retrieval is presented to the end user, the error in recognized characters which could not be detected by the end user when the result of character recognition is confirmed can be corrected by the end user itself to some extent.

Furthermore, since at least one part of character string including several of a plurality of characters composing the keyword string inputted from the input means including the means of recognizing characters is generated, and a text including at least one of them is retrieved, the oversight rate of text retrieval is lowered to some extent even when characters recognized erroneously are included partially in the keyword string. Furthermore, since a text including a longer part of character string is presented to the end user taking a preference for other texts, presentation is made sequentially from the text intended by the end user of text retrieval, thus improving convenience in use as a text retrieval apparatus.

DESCRIPTION OF THE PREFERRED EMBODIMENT

Embodiments of the present invention will be described in detail hereinafter with reference to the drawings.

In the present embodiments, description will be made on a system in which a handwritten keyword string is inputted into an optical character reader, a retrieval command is generated from the result thereof, and a text retrieval apparatus is activated by the retrieval command thereby to acquire desired text information.

Figure 1:
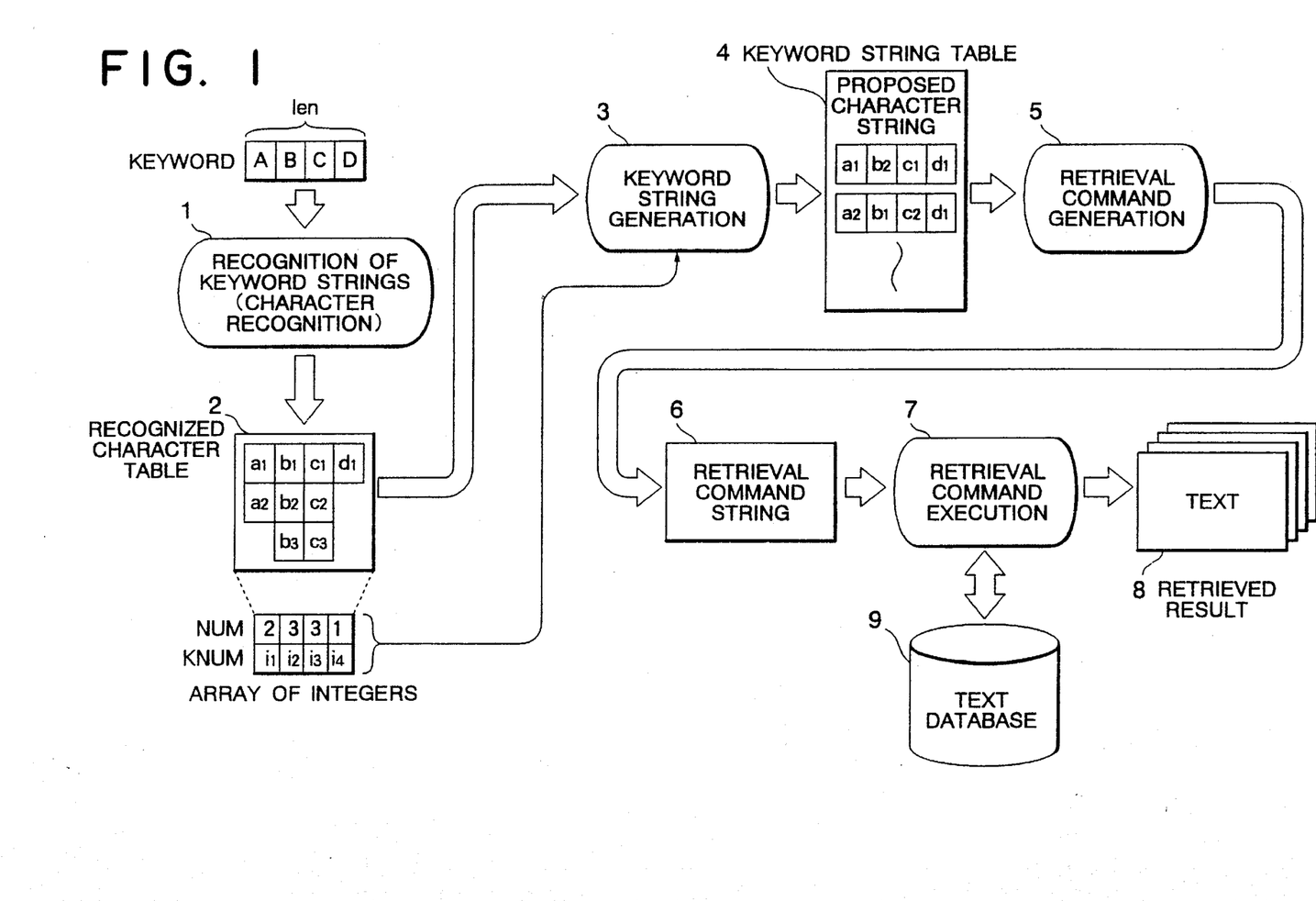
FIG. 1 shows a processing flow in a first embodiment of the present invention.

FIG. 1 is a diagram showing a processing flow in a first embodiment of the present invention.

First, in a step 1, a keyword string handwritten by an end user is recognized by an optical character reader. Several products with printed characters as the object are already in existence as to the optical character reader. In general character recognition processing, a text is read as image data, regions occupied by respective characters are recognized and calculated as quantitative numerical values called a degree of similarity showing to which character and how far the objective character resembles utilizing the knowledge describing the features of the character. Thus, the character having the highest degree of similarity is determined as a first proposed character, and a second and a third proposed characters and so on are determined thereafter. A proposed character is not necessarily composed of one character, but "好" is recognized as two characters of "女子" sometimes for instance, and vice versa. These data resulted from character recognition are stored in a memory unit of a computer to be utilized.

A case that a keyword string is inputted is described in the present embodiment, but the present invention is also applicable to a text itself and a retrieval directing natural language sentence including a keyword string other than the above. In the case other than a keyword string, however, processing for extracting a keyword string from a text and a retrieval directing natural language sentence becomes necessary.

Further, both a method of inputting one keyword string at a time successively from an optical character reader and a method of inputting all keyword strings at the same time may be used as a method of inputting the keyword string. In the latter case, it is possible to extract individual keyword strings easily from the character strings after character recognition by inputting a plurality of keyword strings using delimiting symbols such as quotation marks and parentheses.

The information on characters put forward as proposed characters as the result of character recognition is stored in a recognized character table 2. In the present embodiment, however, only the proposed characters in which the degree of similarity exceeds a predetermined threshold are stored in the recognized character table 2. Since this threshold depends on the optical character reader, it is arranged so that an end user or a system administrator may determine a threshold. To be concrete, a menu for altering the threshold is provided, and, when alteration of the threshold is instructed by the end user or the system administrator, the threshold stored in a memory unit of a computer is altered in accordance with the altered numerical value.

Besides, a method of storing one or more pieces of proposed characters of higher place can be utilized as a method of selecting characters to be stored in the recognized character table 2 other than the method of using the threshold as described above. In this case, the number of proposed characters can be altered by an end user or a system administrator. The concrete method is similar to the case of altering the threshold described above.

Next, in keyword string generation 3, proposed characters stored in the recognized character table 2 are combined with one another thereby to generate a keyword string. For example, keyword strings such as "大口 (mouth)", "太口 (mouth)", "大ロ (katakana character)" and "太ロ (katakana character)" are generated from the character string "大口" inputted by an end user and stored in a keyword string table 4.

Next, in retrieval command generation 5, a retrieval command string 6 for retrieving texts including at least one character string among character strings stored in the keyword string table 4 is generated. Furthermore, in retrieval command execution 7, a text database 9 is retrieved by the retrieval command string 6, and at least one text including a keyword string is taken out and presented to the end user through an output device as a retrieved result 8.

As it is apparent also from FIG. 1, recognition of keyword strings 1, keyword string generation 3, retrieval command generation 5 and retrieval command execution 7 show processing, and a recognized character table 2, a keyword string table 4, a retrieval command string 6, a retrieved result 8 and a text database 9 show files (tables).

Figure 2:
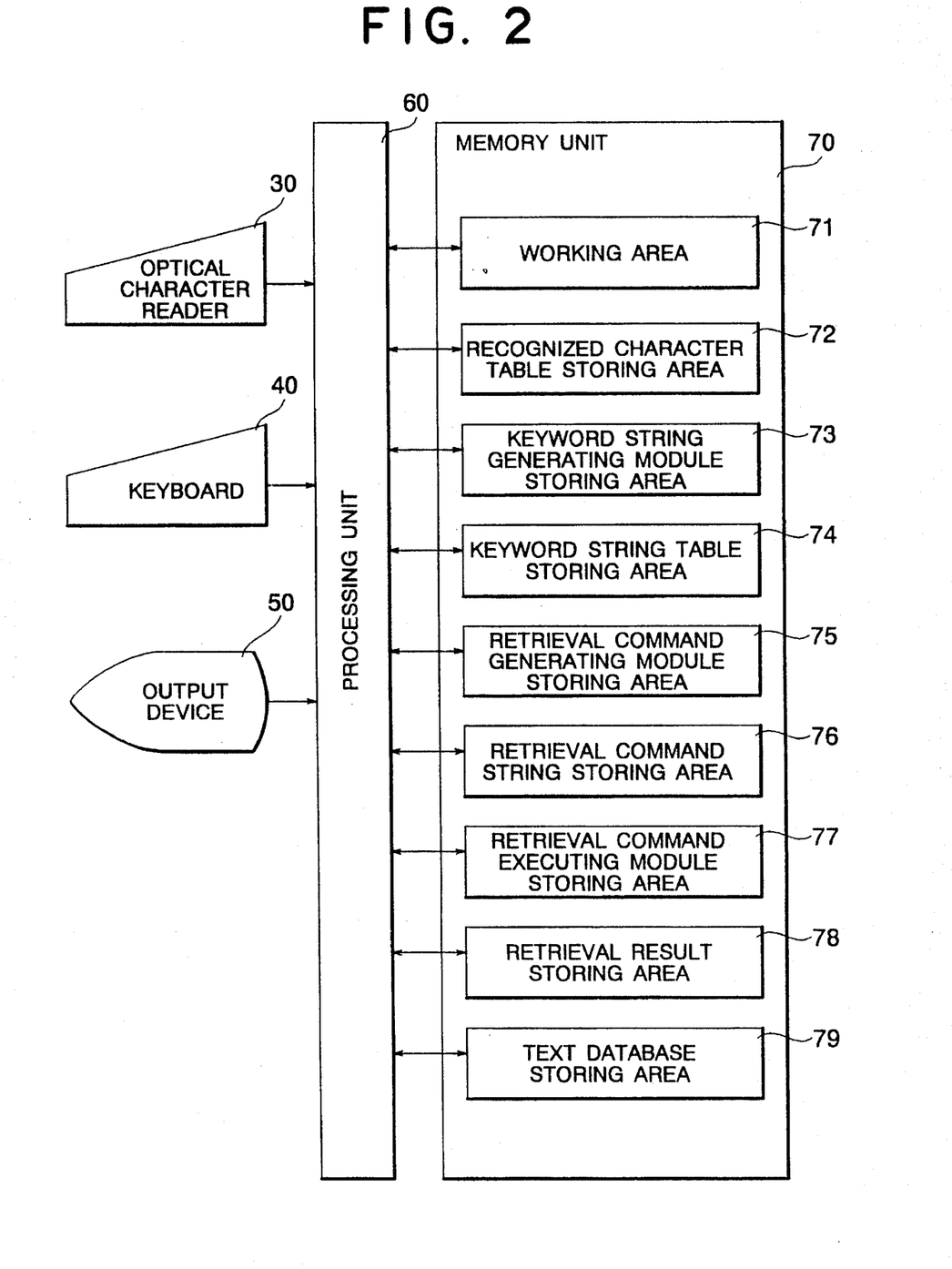
FIG. 2 shows an outline of a hardware structure.

FIG. 2 shows a structure of a computer system for executing the present invention.

The computer system is composed of an optical character reader 30 for recognizing a keyword string handwritten by an end user, a keyboard 40 for inputting retrieval direction (which is also replaceable with menu operation using a mouse or the like), an output device 50 for outputting a retrieved result or the like, a memory unit 70 for storing programs and data, and a processing unit 60 for executing programs stored in the memory unit 70.

The memory unit 70 is composed of following memory areas. The data required for processing are stored in a working area 71, the recognized character table 2 is stored in a recognized character table storing area 72, programs of keyword string generation 3 are stored in a keyword string generation storing area 73, the keyword string table 4 is stored in a keyword string table storing area 74, programs of retrieval command generation are stored in a retrieval command generation storing area 75, the retrieval command string 6 is stored in a retrieval command string storing area 76, programs of retrieval command execution 7 are stored in a retrieval execution storing area 77, a plurality of texts are stored in a retrieved result storing area 78 as the retrieved result 8, and a text database 9 which becomes the object of retrieval is stored in a text database storing area 79. Besides, the text database 9 can also be stored in another computer connected through a network based on a Client Server System (CSS).

"大口定 期" has been designated above by the end user as the keyword string, but a case that a part of a keyword string handwritten by the end user is recognized erroneously will be described hereinafter.

Figure 3:
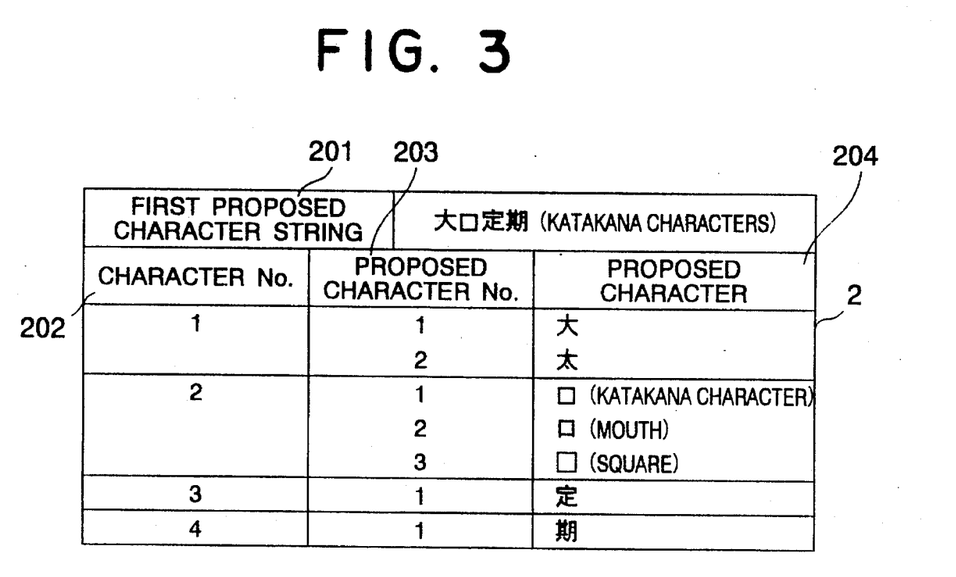
FIG. 3 shows a structure of a recognized character table.

FIG. 3 shows a structure of the recognized character table 2.

A character string formed by combining first proposed characters of respective characters is stored in an area 201, description numbers of respective characters are stored in an area 202, the priority order of proposed characters is stored in an area 203, and proposed characters composed of corresponding one character or more are stored in an area 204.

When a certain character is recognized as a plurality of characters (for example, when "好" is recognized as "女子"), the plurality of characters such as "女子" are stored in the area 204. In the case reverse to the above (for example, "女子" is recognized as "好"), two character portions of the area 204 are provided, and "好" is stored in the first character portion and the second character portion is made blank. When "女子" is also considered as a proposed character other than "好", "女" is stored in the first character portion, and "子" is stored in the second character portion.

As shown in FIG. 3, it is assumed in the present embodiment that the first proposed character is "大" and the second proposed character is "太" as the proposed recognized character for "大" of "大口定 期", that the first proposed character is "ロ (katakana character)", the second proposed character is "口(mouth)" and the third proposed character is "□ (square)" as the proposed recognized character for "口", and further that the proposed character is narrowed down into one and recognized correctly as to "定" and "期".

Figure 4:
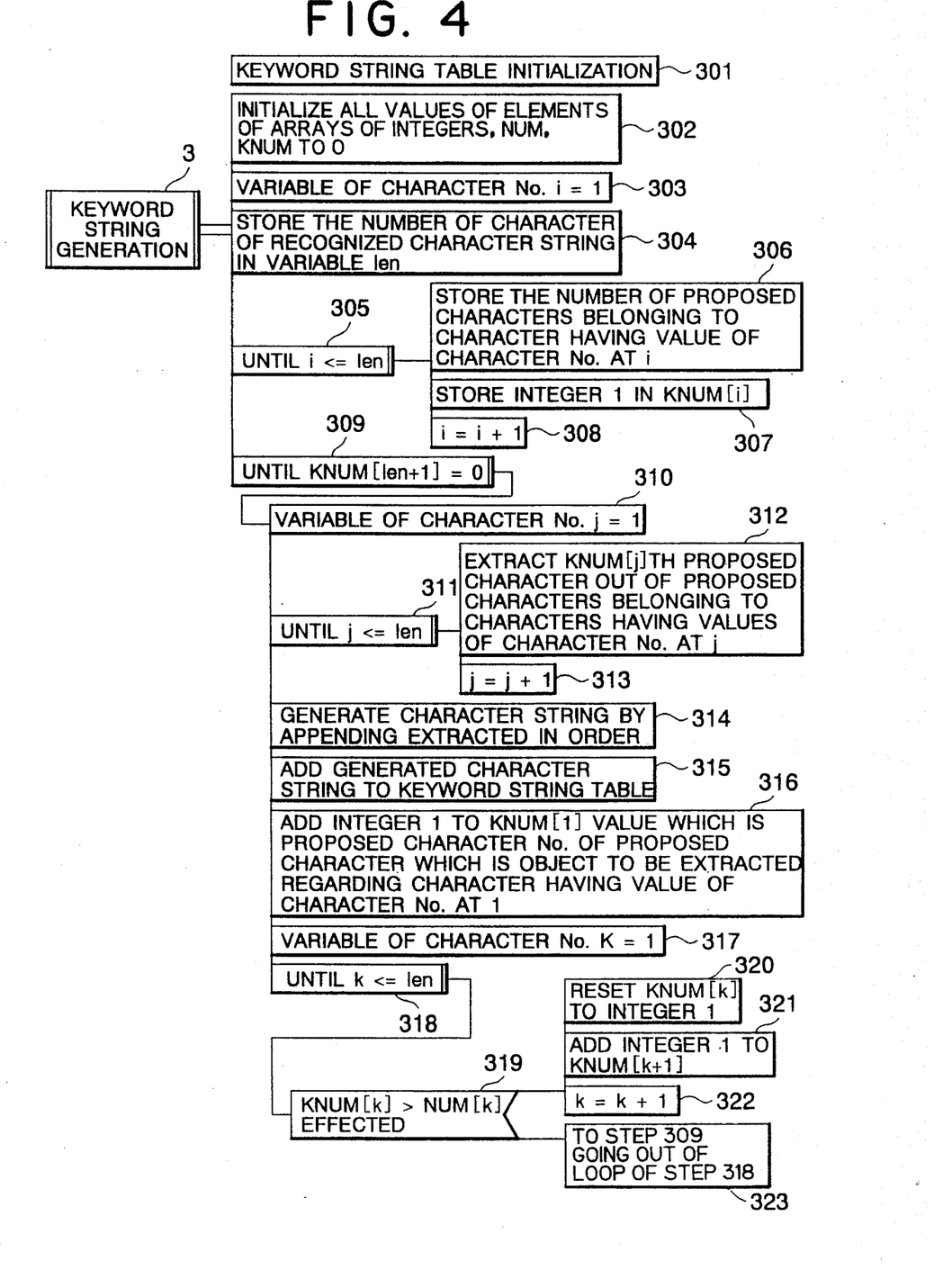
FIG. 4 is a PAD showing steps of processing procedures by keyword string generation.

FIG. 4 is a problem analysis diagram (PAD) showing processing steps of procedure of keyword string generation 3, and this processing will be described hereinafter in accordance with the PAD.

The processing from a step 301 to a step 308 is a processing for initialization of a variable and a table.

First, the keyword string table 4 in which keyword strings generated by the keyword string generation 3 are stored is initialized (cleared) (the step 301).

Next, an integer 0 is set in each element of an array in an array of integers NUM (an array number corresponds to the character number 202) in which the number of proposed characters for each of characters forming the recognized character string 201 and an array of integers KNUM (an array number corresponds to the character number 202) in which the proposed character number 203 of the proposed character 204 which becomes the object of extraction is stored for each character when the keyword string is generated in a step 312 and a step 314, thereby to initialize the array of integers (a step 302).

Next, 1 is set to a variable i of character number expressing the character number 202 of the recognized character string (a step 303), and the number of characters forming the recognized character string 201 is stored in an integer variable len (a step 304).

Next, while a value of the variable i of the character number is at the value of the variable len or below, processing 306 to 308 thereafter is executed repeatedly (a step 305).

First, the number of the proposed characters 204 corresponding to those characters having the value of the character number 202 at i is stored in the ith element of the array of integers NUM (a step 306).

Next, an integer 1 is stored (initialization) in the ith element of the array of integers KNUM (a step 307), an integer 1 is added to the variable i of character number (a step 308), and similar processing is repeated for a next character, too.

Steps 309 to 315 show the processing for generating a keyword string. Namely, all character strings obtainable by combining proposed characters 204 corresponding to respective characters are generated, and are stored in the keyword string table 4 as keyword strings. While the value of the (len+1)th array of integers KNUM is 0, processing 310 to 323 thereafter is executed repeatedly (a step 309).

First, 1 is set to a variable j of character number corresponding to the character number 202 of the recognized character string 201 (a step 310).

Next, while the value of the variable j of character number is at the value of the variable len expressing the number of characters forming the recognized character string 201 or below, following processings 312 and 313 are performed (a step 311). Namely, the KNUM [j]th proposed character 204 is extracted from proposed characters (NUM [j] pieces are in existence) included in the characters having the value of the character number 202 is j (a step 312), an integer 1 is added to the value of the variable j of character number (a step 313), and similar processing is repeated for a next character.

Next, extracted proposed characters are appended consecutively thereby to generate a keyword string (a step 314), and the generated keyword string is stored additionally in the keyword string table 4 (a step 315).

In steps 316 to 323, the proposed character number 203 of the proposed character 204 to be extracted in the step 312 is renewed in order to generate a next new keyword string.

Namely, a proposed character of the next proposed character number 203 is taken out as the proposed character 204 which becomes the object of extraction with respect to the first character of the recognized character string 201. When there is no next proposed character, the proposed character which becomes the object of extraction with respect to the first character is returned to the first proposed character, and the proposed character of the next proposed character number is taken out as the proposed character which becomes the object of extraction with respect to the character right adjacent to the first character. When there is neither next proposed character, the proposed character which becomes the object of extraction with respect to the right adjacent character is returned to the first proposed character, and a proposed character of the next proposed character number is taken out as the proposed character which becomes the object of extraction with respect to further right adjacent character of the right adjacent character.

The processing described above bears resemblance to carry processing in which, when 1 is added to 9, 9 is returned to 0 and 1 is added to the position of adjacent 10 in counting numeric characters. In the processing described above, the carry value is different with respect to each character of the recognized character string 201, and the value shows the number of proposed characters for each character.

First, an integer 1 is added to KNUM [1] in which the proposed character number 203 of the proposed character 204 which becomes the object of extraction when a keyword string is generated is stored with respect to the first character of the recognized character string (a step 316). Furthermore, an integer 1 is set to a variable k of character number corresponding to the character number 202 of the recognized character string 201 (a step 317).

Next, while the variable k of character number is at the value of the variable len expressing the number of characters of the recognized character string 201 or below, following processings 319 to 323 are performed (a step 318).

First, it is determined whether the value of KNUM [k] in which the proposed character number 203 of the proposed character 204 which is the object of extraction with respect to the kth character is stored is larger than the value of the number NUM [k] of proposed characters of the kth character or not (a step 319). When the value of KNUM [k] is larger than the value of NUM [k], it is determined that all of the proposed characters 204 which become the objects of extraction with respect to the kth character have been extracted, the proposed character of the kth character is returned to the first character, and the proposed character 204 which becomes the object of extraction with respect to the adjacent (k+1)th character is taken out as the next proposed character.

Namely, an integer 1 is set to KNUM [k] expressing the proposed character number 203 of the kth proposed character 204 (a step 320), and an integer 1 is added to KNUM [k+1] expressing the proposed character number 203 of the (k+1)th proposed character 204 adjacent to the kth proposed character (a step 321).

Next, an integer 1 is added to the variable k of character number (a step 322), and the loop of the step 318 is repeated.

When the value of KNUM [k] is not larger than the value of NUM [k] in the step 319, the loop of the step 309 is repeated bypassing the loop of the step 318 (a step 323).

Concrete processing contents of the keyword string generation 3 will be described with the recognized character table 2 shown in FIG. 3 as an exemplification of the input.

After initialization, the numbers of proposed characters corresponding to respective characters of the recognized character string 201 are stored consecutively in the array of integers NUM. As a result, integer values 2, 3, 1 and 1 are stored consecutively from the head in the array of integers NUM. The values of other elements of an array are zero. On the other hand, integer values 1, 1, 1 and 1 are stored consecutively from the head in the array of integers KNUM by the step 307. The values of other elements of an array are zero.

Proposed characters for respective characters are extracted in the step 312, but the values 1, 1, 1 and 1 are stored consecutively from the head in the array of integers KNUM at this point of time. Therefore, the proposed characters 204 having the proposed character number 203 at 1 are extracted with respect to respective characters.

Namely, "大", "ロ (katakana character)", "定" and "期" are extracted, respectively. In a step 314, "大ロ定期 (ロ is a katakana character)" which is a keyword string is generated by appending these proposed characters 204 one after another, and in a step 315, "大ロ定期 (ロ is a katakana character)" is stored in the keyword string table 4.

Next, in a step 316, the proposed character which becomes the object of extraction with respect to the character "大" is altered from present "大" to "太" which is the next proposed character. Namely, an integer 1 is added to the value (the present value is 1) of KNUM [1], and the value of KNUM [1] becomes 2.

In a step 318, the process is returned to the step 309 by a step 323 since the value 2 of KNUM [1] is not larger than the value 2 of NUM [1], and the above-described processing is repeated again. Since values 2, 1, 1 and 1 have been stored one after another from the head in the array of integers KNUM at this point of time, "太", "ロ (katakana character)", "定" and "期" are extracted as the proposed characters 204 in a step 312, respectively, "太ロ定期 (ロ is a katakana character)" which is a keyword string is generated in a step 314, and "太ロ定期 (ロ is a katakana character)" is stored in the keyword string table 4 in a step 315.

Next, an integer 1 is added to KNUM [1] again to produce a value of 3. Since the value 3 of KNUM [1] is larger than the value 2 of NUM [1] (i.e., the proposed character 204 next to "太" does not exist) in a step 318, the value of KNUM [1] is returned to 1 and an integer 1 is added to the value (the present value is 1) of the adjacent KNUM [2] to produce the value of 2 in a step 320. Since the value 2 of KNUM [2] is not larger than the value 3 of NUM [2], the process is returned to the step 309 by the step 323 and the above-described processing is repeated.

Similarly to the above, "太ロ定期 (ロ is a mouth)", "太ロ定期 (ロ is a mouth)", "大定期 (口 is a square)" and "太定期 (口 is a square)" are generated one after another as the keyword strings by the step 312 and the step 314, and all of the keyword strings (6 types in this case) are stored in the keyword string table 4.

Figure 5:
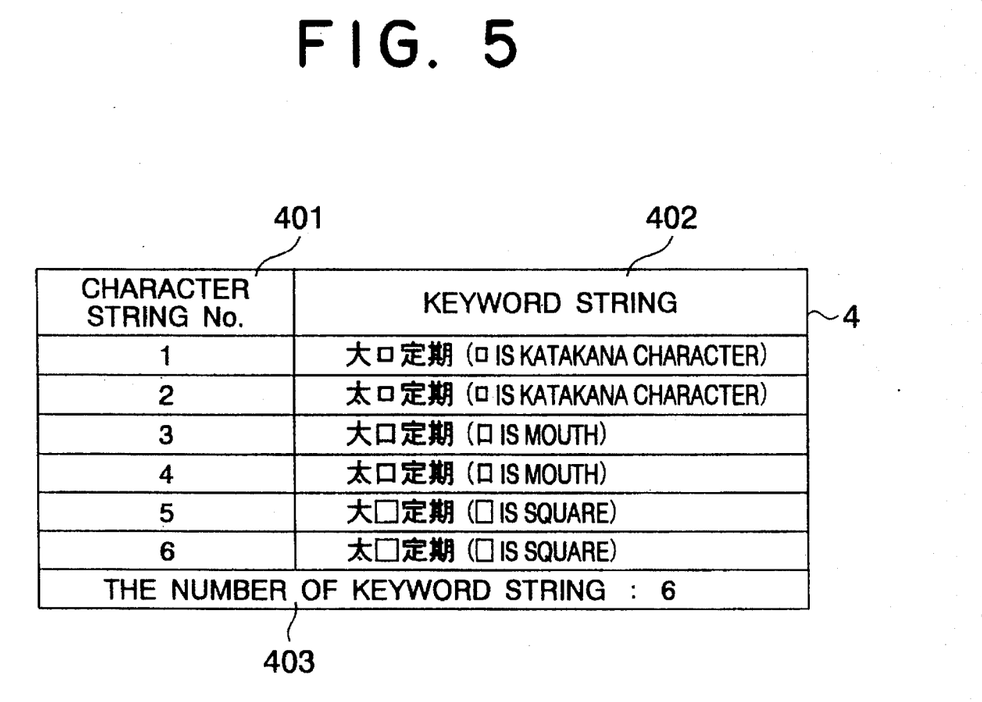
FIG. 5 shows a structure of a keyword string table.

FIG. 5 shows a structure of the keyword string table 4.

Keyword strings 402 generated by the keyword string generation 3 and the number of keyword strings 403 are stored in the keyword string table 4.

Figure 6:
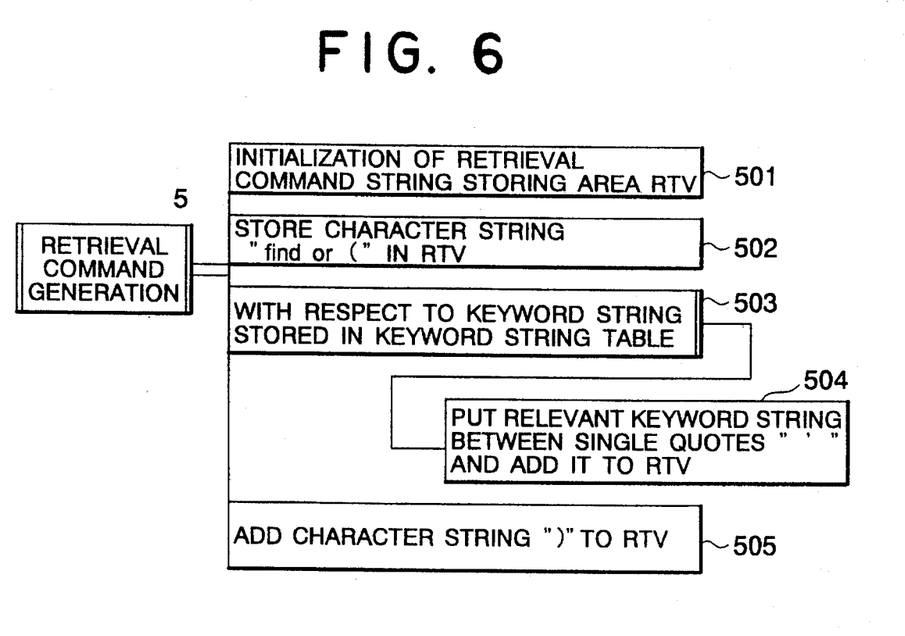
FIG. 6 is a PAD showing steps of procedures for generating a retrieval command.
Figure 7:
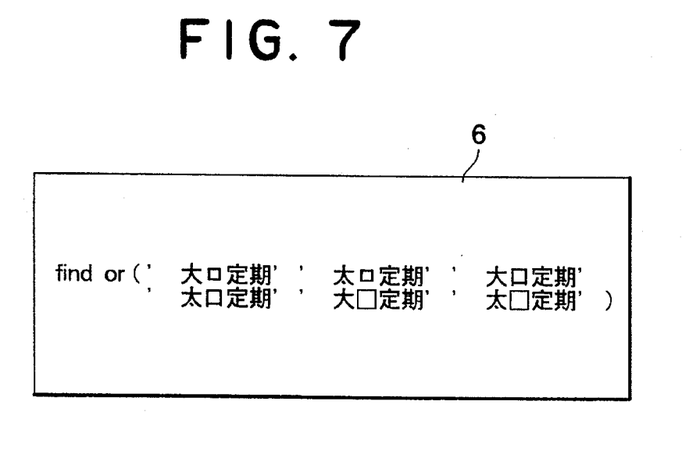
FIG. 7 shows a structure of an example of a retrieval command character string.

FIG. 6 is a PAD showing the processing steps of procedure of retrieval command generation 5, which is the processing for generating a retrieval command string 6 shown in FIG. 7.

The retrieval command is able to give various types of retrieval directions other than such a retrieval direction "retrieve texts including at least one keyword string" as described in the present embodiment. The original retrieval command generation 5 is a processing for generating such all types of retrieval commands at the same time, but only the portion of retrieval commands related to the present embodiment will be discussed hereinafter. The description of this processing will be made hereinafter with reference to the PAD shown in FIG. 6.

First, a retrieval command string storing area 76 (hereinafter referred to as RTV (simply, abbreviation of retrieve)) where the output result of retrieval command generation 5 is stored is initialized (a step 501). Next, a command "find" showing a retrieval direction and an operator "or (" showing retrieval of texts including any one character string of argument character strings are stored in RTV (a step 502).

Next, processing 504 is performed on each of keyword strings stored in the keyword string table 4 (a step 503). Namely, each of the keyword strings is stored in RTV while being put between single quote characters "'" (a step 504). After the step 503, a character string ")" is added to RTV, thus forming a retrieval command 6 shown in FIG. 7.

Since all of the results of the keyword string generation 3 are stored as arguments, and "太ロ定期" which is a correct interpretation is included in these arguments, the oversight rate of retrieval does not change as compared with a case when the result of character recognition is not in error.

As described above, according to the present embodiment, it is possible to realize text retrieval in which increase of the oversight rate due to errors in character recognition is absorbed even when the recognized character strings where an error exists in the result of character recognition are delivered to a text retrieval system as they are as arguments.

Next, a second embodiment in which text retrieval is performed with a character string in which a part of the characters included in the keyword string is replaced with symbols showing optional characters will be described.

Figure 8:
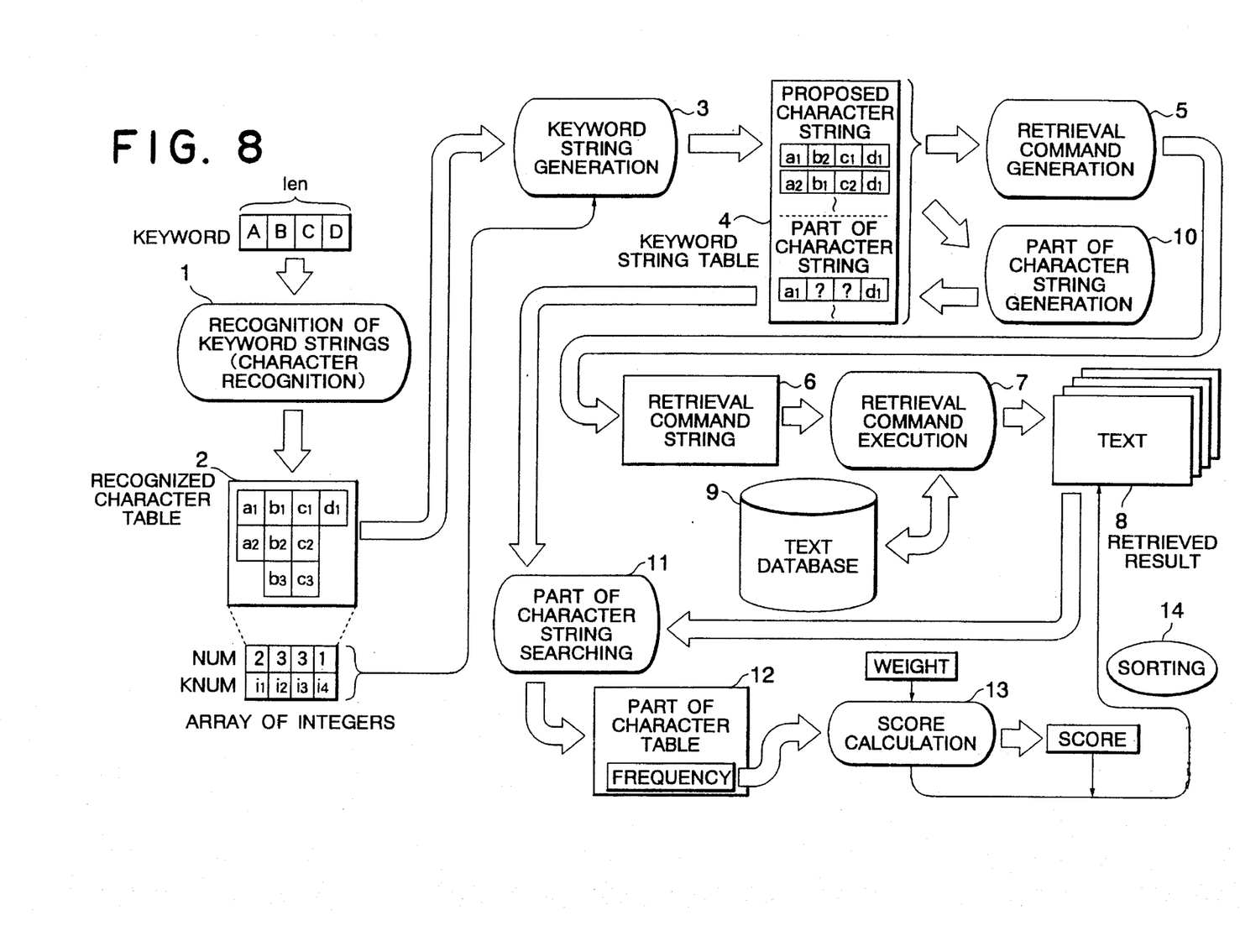
FIG. 8 shows an outline of processing in a second embodiment.

FIG. 8 shows an outline of processing in the second embodiment. Processings 1, 3, 5 and 7 and data 2, 4, 6, 8 and 9 shown in FIG. 8 are the same as those shown in FIG. 1, respectively. However, a new area is added to the table 4 as described hereinafter.

When a handwritten character is recognized, it happens in many cases that the correctly interpreted character is not included in proposed recognized characters. In such a case, since a correct keyword is not generated in keyword string generation 3, oversight in retrieval is increased.

In order to solve the above-mentioned problems, part of character string generation 10 is provided, part of character strings formed by replacing a part of respective character strings with symbols showing optional characters are generated from respective keyword strings generated in the keyword string generation 3, and these part of character strings are added to the keyword string table 4 as keyword strings in the present embodiment.

For example, in the keyword string table 4 shown in FIG. 5, part of character strings in which discontinuous part of character strings are arranged being separated by several characters' portion are also generated in such a manner as "太?定", "ロ?期" and "太? ?期" from the keyword string "太ロ定期" other than continuous part of character strings such as "太", "ロ", "定", "期", "太ロ", "ロ定", "定期", "太ロ定", "ロ定期" and "太ロ定期". The symbol "?" represents an optional character. It is disclosed in the Transactions of the 45th National Convention of the Information Processing Society of Japan (3)3-239 to 244 for instance that such a symbol showing an optional character can be used.

In the processing described above, such processing is performed that a binary number composed of a number of figures of the number of characters is considered for a keyword character string, 1 is added at a time to this binary number while having each figure correspond to each character, characters corresponding to figures set with 1 are extracted, and "?" is applied to the character corresponding to 0 which is put between 1 without extracting characters corresponding to figures set with 0, thus making it possible to extract a part of character string as described above easily as the result. Furthermore, processing for removing a duplicate keyword (part of character string) is performed lastly, and all of part of character strings corresponding to the keyword string are extracted.

The processing described above will be explained with a keyword string "太ロ定期" having four characters as an exemplification for instance. Binary numbers from a binary number "0000" of four figures to a binary number "1111" which is obtainable by adding 1 in consecutive order thereto are considered, and "太", "ロ", "定" and "期" are assigned to respective figures of the binary number consecutively. According to the processing described above, no character is extracted with the first "000", but "期" is extracted with the next "0001", "定" is extracted with "0010", "定期" is extracted with "0011", "ロ" is extracted with "0100", "ロ?期" is extracted with "0101", and part of character strings are extracted in a similar manner thereafter. Thus, "太ロ定期" is extracted with the last "1111".

In the case of "太ロ定期", even when there is no proposed character only except "ロ (katakana character)" as the result of character recognition of "口 (mouth)", desired texts are retrieved without oversight by retrieving texts including "大?定期 (? is an optional character)" by adding the part of character string as described above as a keyword string. Besides, it is possible to select whether the part of character generation 10 is to be performed or not based on the direction by the end user.

Now, when the number of characters of the keyword string is increased, noises, i.e., unrelated texts are increased in the result of retrieval using the part of character string. So, when the retrieval command 6 (the form of which shown in FIG. 7) for retrieving texts including any one of a plurality of keyword strings is executed by the retrieval execution 7 shown in FIG. 8, corresponding plurality of texts are extracted as the retrieved result 8.

Next, in part of character string searching 11, it is searched which part of character string is included by a character string searching function with respect to each of extracted texts. Since this character string searching function is prepared as one of basic commands in a work station or a personal computer at present, processing described above can be realized by utilizing them.

Figure 9:
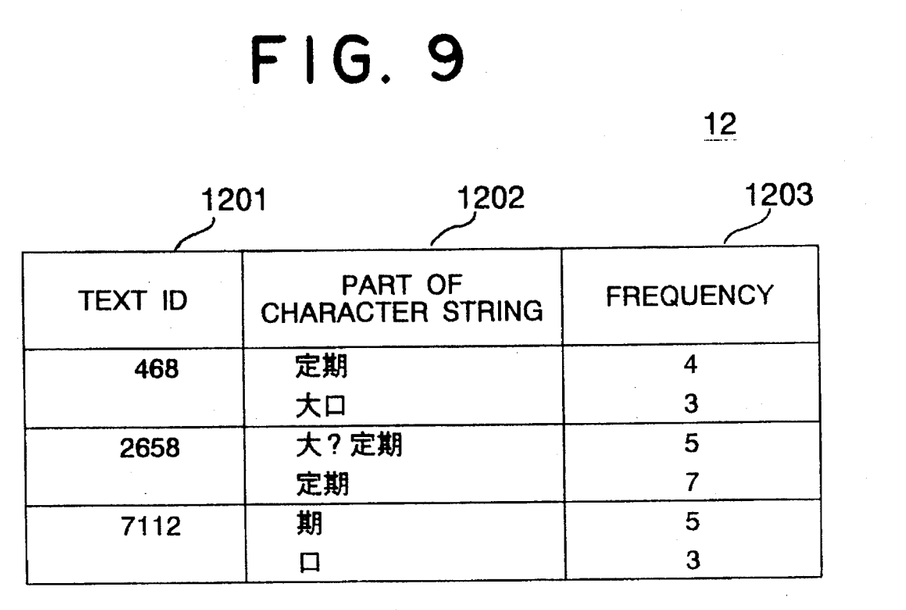
FIG. 9 shows a structure of a part of character string table in the second embodiment.

As the output of the part of character string searching 11, for example, data with a text of retrieved result and a part of character string included therein formed into a pair are generated, and are stored in a part of character string table 12 such as shown in FIG. 9. A text ID 1201, a part of character string 1202 included in that text and frequency of the part of character string are stored in the part of character string table 12.

On the other hand, weight is set in advance to respective keyword strings. The weight may be set by an end user or a system administrator or the weight may also be set in proportion to the number of characters forming the keyword string. According to the latter, weighting is automated. What is important is that the larger the number of characters forming the keyword string is, the larger (or smaller) the weight is made. Because, as the number of characters of a part of character string becomes larger, it resembles more to the keyword string designated by the end user, and the text including the part of character string has a larger degree of confidence that it is the text required by the end user.

In the present embodiment, the number of characters of those that form the keyword string is defined as the weight of a keyword character string. Namely, the weight of "大口定 期" is 4, the weight of "大" is 1 and the weight of "大？定期" is 3.

In text score calculation 13, the sum of weights of the keyword strings included in the text is calculated with respect to respective texts, and the score of each text is outputted. Namely, the frequency of each part of character string stored in the part of character table 12 is multiplied by the weight (number of characters), the sum is calculated for each text and the obtained value is outputted as the score of the text. As a method of calculating the score, there are a method of adding up the weights assuming that the frequency is all 1, a method of calculation assuming that the frequency of only part of character string in which the number of characters is one is 1 and so on other than the method described above.

According to the method of weighting in accordance with the number of characters as described above, respective scores of three texts shown in FIG. 9 are obtained as follows. Namely, the score of ID 468 is 14, that of ID 2658 is 29 and that of ID 7112 is 8.

Then, a plurality of texts retrieved based on the scores are sorted and presented to the end user together with the score in the order from a text having a higher score (14). In FIG. 9, the texts are presented to the end user from the output means together with the scores in the order of ID 2658, ID 468 and ID 7112 based on the scores described above.

According to the above-mentioned method, even when there is no correctly interpreted character among proposed characters included in the result of character recognition, a retrieved result without oversight is obtainable by generating part of character strings and retrieving the text database 9. Further, even when a plurality of useless texts are retrieved due to increase of noises, the operation for selecting several cases of texts as many as required by the end user from the higher place.

Besides, an optical character reader is assumed as input means in the embodiment described above, but the keywords are stored in a memory unit of a computer as a character string finally even when a keyword string is inputted by input means (such as a keyboard and a sound recognizing device) other than the optical character reader. Therefore, it is apparent that these input means are also applicable. In particular, when a keyword is inputted from a keyboard, the present invention can be applied to a mistake in inputting a character string.

Figure 10:
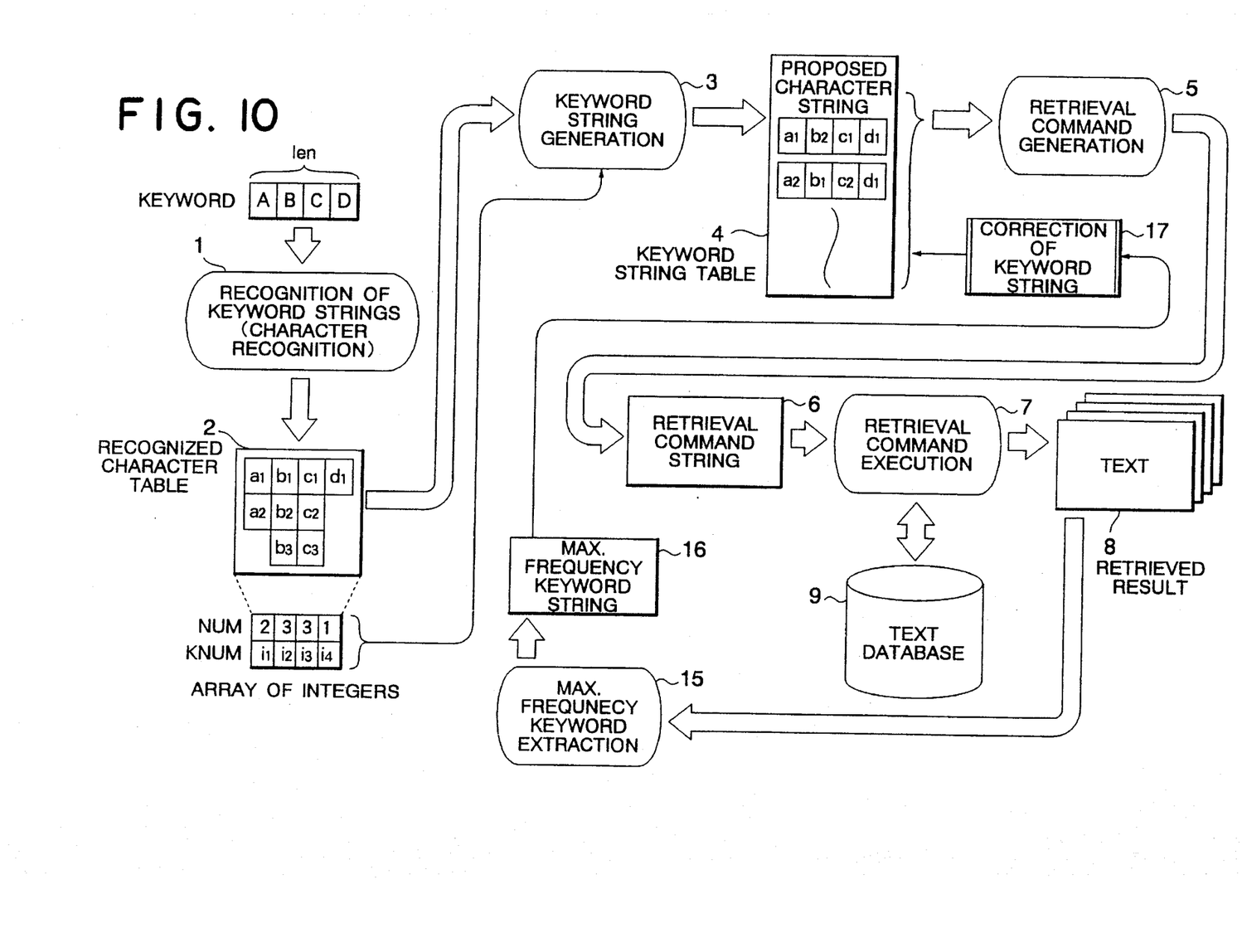
FIG. 10 shows an outline of processing in a third embodiment.

Next, a third embodiment in which a keyword string is corrected based on a retrieved result will be described with reference to FIG. 10. Processings 1, 3, 5 and 7 and data 2, 4, 6, 8 and 9 shown in FIG. 10 are the same as those that are shown in FIG. 1, respectively.

In maximum frequency keyword extraction 15, it is searched which keyword string has been included most from the result of retrieval executed in retrieval execution 7 based on the retrieval command 6 shown in FIG. 7, and maximum frequency keyword string 16 which has been included most in the retrieved result is outputted. Furthermore, when the maximum frequency keyword string 16 is different from the first proposed character string (201 in FIG. 3) recognized by the optical character reader, a message informing of an error in the result of character recognition is presented to the end user through the output means together with display of the different portion.

The end user checks to find whether the first proposed character string is suited or the keyword string included most in text retrieval is suited better, and, if the keyword string is suited better, that portion is corrected by an editor or the like (17). Furthermore, a desired text is obtainable easily by retrieving again using the corrected result.

According to the present embodiment, even when the end user does not notice that the result of character recognition is in error, it is possible to correct the result of character recognition by utilizing the result obtained by retrieving the text. The present embodiment is also effective in particular when the result of character recognition is reused in other processing.

According to the present invention, even when there are errors to some extent in the result of character recognition in a keyword string handwritten by an end user, text retrieval is possible without increasing omission in the result of text retrieval. Further, according to the present invention, since an error in the result of character recognition is indicated based on the result of retrieving a text, correction of the keyword can be made easily by the end user. Furthermore, according to the present invention, since a text close to the requirement by an end user is presented with priority among retrieved plurality of texts, selection of retrieved result can be made easily.

We claim:

1. A text retrieval method using a text database holding at least one text, character recognizing means for recognizing a handwritten character string, a processing unit and output means for outputting a retrieved result, the method comprising the steps of:

(a) extracting at least one proposed recognized character for each character by a method of extracting a predetermined proposed recognized character from recognized characters of respective characters of a keyword recognized by said character recognizing means;

(b) generating at least one character string by combining proposed recognized characters of said respective characters;

(c) generating a retrieval command for retrieving a text including at least said one character string among said generated character strings out of said text database;

(d) executing said retrieval command;

(e) detecting the number of cases among the texts in said text database in which each of said character strings generated from said proposed recognized characters is included;

(f) holding said number of cases for each of said character strings;

(g) when respective characters forming said character string included in the most texts are different from the first proposed characters of the corresponding characters recognized by said means of recognizing characters, presenting to an end user to that effect through said output means;

(h) presenting to the end user whether the first proposed characters of the characters recognized by said means of recognizing characters are to be corrected to the characters forming said character string or not; and (i) correcting said recognized character string to said character string based on a direction of correction from the end riser.

2. A text retrieval method using a text database for holding at least one text, input means for inputting at least one character string, a processing unit and output means for outputting a retrieved result, the method comprising the steps of:

(a) generating a part of a character string composed of at least one character included in said inputted character string and formed without disturbing a description order of respective characters based on the character string inputted from said input means, wherein, when the characters forming said generated part of the character string appear discontinuously in the originally inputted character string, said part of the character string is formed of a plurality of continuous character strings with discontinuous portions as boundaries, and said plurality of continuous character strings are formed by separating them by the number of characters existing between said continuous character strings in the originally inputted character string; and (b) generating a retrieval command for retrieving a text including at least one of said generated part of the character strings out of said text database, wherein the retrieval command for retrieving out of said database the texts, including those in which said plurality of continuous character strings are separated by said number of characters, is generated by referring to said number of characters.

3. A text retrieval method using a text database for holding at least one text, input means for inputting at least one character string, a processing unit and output means for outputting a retrieved result, the method comprising the steps of:

(a) generating a part of a character string composed of at least one character included in said inputted character string and formed without disturbing a description order of respective characters based on the character string inputted from said input means;

(b) generating a retrieval command for retrieving a text including at least one of said generated part of the character strings out of said text database;

(c) retrieving said text database by said retrieval command;

(d) detecting which of the part of the character string is included with respect to each text extracted by the execution of said retrieval command;

(e) summing up weights preset to said included part of the character strings to calculate the score of each of said texts with respect to each of said extracted texts, wherein the weights preset to said part of the character strings are heavier as the length of the character strings forming said part of the character strings is larger; and (f) presenting to an end user, through said output means, the text having higher score than other texts.

4. A text retrieval method using a text database holding at least one text, character recognizing means for recognizing a handwritten character string, a processing unit and output means for outputting a retrieved result, the method comprising the steps of:

(a) extracting at least one proposed recognized character for each character by a method of extracting a predetermined proposed recognized character from recognized characters of respective characters of a keyword recognized by said character recognizing means, wherein said method of extracting the predetermined proposed recognized character operates such that a predesignated number of said proposed recognized characters are extracted;

(b) generating at least one character string by combining proposed recognized characters of said respective characters; and (c) generating a retrieval command for retrieving a text including at least said one character string among said generated character strings out of said text database.

5. A text retrieval apparatus composed of a text database for holding at least one text, character recognizing means for recognizing a handwritten character string, a processing unit and output means for outputting a retrieved result, the apparatus comprising:

(a) means for extracting proposed recognized characters for extracting at least one recognized character as a proposed recognized character for each character from the recognized characters of respective characters of a keyword recognized by said character recognizing means by a predetermined method of extracting proposed recognized characters, wherein said method of extracting proposed recognized characters is a method of extracting a predesignated number of proposed recognized characters;

(b) means for generating at least one character string by combining proposed recognized characters of said respective characters; and (c) means for generating a retrieval command for retrieving texts including at least one of said character strings among said generated character strings out of said text database.

6. A text retrieval apparatus composed of a text database for holding at least one text, character recognizing means for recognizing a handwritten character string, a processing unit and output means for outputting a retrieved result, the apparatus comprising:

(a) means for extracting proposed recognized characters for extracting at least one recognized character as a proposed recognized character for each character from the recognized characters of respective characters of a keyword recognized by said character recognizing means by a predetermined method of extracting proposed recognized characters;

(b) means for generating at least one character string by combining proposed recognized characters of said respective characters;

(c) means for generating a retrieval command for retrieving texts including at least one of said character strings among said generated character strings out of said text database;

(d) means for executing said retrieval command;

(e) means for searching a keyword string for detecting the number of cases among the texts in said text database in which each of said character strings generated from said proposed recognized characters is included;

(f) case number storing means for holding said number of cases with respect to each of said character strings;

(g) means for collating recognized results for determining whether respective characters forming said character string included in the most texts are different from the first proposed character of the corresponding characters recognized by said character recognizing means or not;

(h) when a character different from said first proposed character is in existence, means for presenting to that effect to an end user through said output means;

(i) means for presenting to an end user whether the first proposed character of the characters recognized by said means for recognizing characters is to be corrected to said character or not; and (j) means for correcting said recognized character string to said character string when an end user directs correction.

7. A text retrieval apparatus composed of a text database for holding at least one text, input means for inputting at least one character string, a processing unit and output means for outputting a retrieved result, the apparatus comprising:

(a) part of a character generating means for generating, based on a character string inputted from said input means, a part of a character string composed of one character or more included in said inputted character string and formed without disturbing a description order of respective characters, wherein said part of the character generating means further comprises, (a1) means for determining whether the characters forming said generated part of the character string appear discontinuously in the originally inputted character string or not, and (a2) means for forming said part of the character string, when the characters appear discontinuously, of a plurality of continuous character strings with the discontinuous portions as boundaries and with said plurality of continuous character strings separated by the number of characters existing between said continuous character strings in the originally inputted character string; and (b) retrieval command generating means for generating a retrieval command for retrieving a text including at least one type among said generated part of character strings out of said text database, wherein said means of generating a retrieval command further comprises, (b1) means for generating, by referring to said number of characters, a retrieval command for retrieving out of said text database those texts in which said plurality of character strings are separated by said number of characters.

8. A text retrieval apparatus composed of a text database for holding at least one text, input means for inputting at least one character string, a processing unit and output means for outputting a retrieved result, the apparatus comprising:

(a) part of a character generating means for generating, based on a character string inputted from said input means, a part of a character string composed of at least one character included in said inputted character string and formed without disturbing a description order of respective characters;

(b) retrieval command generating means for generating a retrieval command for retrieving a text including at least one type among said generated part of the character strings out of said text database;

(c) means for detecting which of said part of character strings is included with respect to each of the texts extracted by execution of said retrieval command;

(d) means for calculating scores for calculating a score of each of said texts by summing up the weights preset to said included part of the character strings with respect to each of said extracted texts, wherein the weights preset to said part of the character string are heavier as the length of the character strings forming said part of the character strings is larger; and (e) means for outputting to an end user, taking preference to, said text having a high score.

* * * * *